(12) United States Patent
Epstein et al.

(10) Patent No.: US 6,301,005 B1
(45) Date of Patent: *Oct. 9, 2001

(54) INSPECTION SYSTEM FOR OPTICAL COMPONENTS

(75) Inventors: Sheldon L. Epstein, Wilmette; Richard G. Gore, Bartlett, both of IL (US)

(73) Assignee: Wesley Jessen Corporation, Des Plaines, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/591,533

(22) PCT Filed: Jul. 28, 1994

(86) PCT No.: PCT/US94/08218

§ 371 Date: Jan. 25, 1996

§ 102(e) Date: Jan. 25, 1996

(87) PCT Pub. No.: WO95/04264

PCT Pub. Date: Feb. 9, 1995

Related U.S. Application Data

(63) Continuation-in-part of application No. 08/099,966, filed on Jul. 29, 1993, now abandoned.

(51) Int. Cl.[7] .................................................. G01B 9/00
(52) U.S. Cl. .................................... 356/124; 356/244
(58) Field of Search ............................. 356/124, 125, 356/126, 127, 239, 244, 246; 206/5.1; 264/2.6; 351/219, 230

(56) References Cited

U.S. PATENT DOCUMENTS

| | | | |
|---|---|---|---|
| D. 299,085 | 12/1988 | Martinez | D3/34 |
| 3,268,068 | 8/1966 | Le Grand | 206/5 |
| 3,556,636 | 1/1971 | Roberts et al. | 350/96 |

(List continued on next page.)

FOREIGN PATENT DOCUMENTS

| | | | |
|---|---|---|---|
| 88816/91 | 6/1992 | (AU) . | |
| 3432002 | 3/1986 | (DE) . | |
| 0 063 761 | 11/1982 | (EP) . | |
| 0 249 799 | 12/1987 | (EP) . | |
| 0 491 663 | 6/1992 | (EP) . | |
| 0 604 178 A1 | 6/1994 | (EP) . | |
| 1 536 497 | 12/1978 | (GB) . | |
| 2 058 393 | 4/1981 | (GB) . | |
| 2 226 272 | 6/1990 | (GB) . | |
| 0 134 339 | 10/1980 | (JP) | 356/124 |
| 55-134339 | 10/1980 | (JP) . | |
| 0 074 525 | 3/1989 | (JP) | 206/5.1 |
| 2-257007 | 10/1990 | (JP) . | |
| 4-305144 | 10/1992 | (JP) . | |

OTHER PUBLICATIONS

Wilder et al, "Electronic Imaging of Defects in Contact Lens", Scientifica, Jun. 1989.*

"The Highlighter System", Jun. 1989.*

Suzuki, et al., Measurement of spherical aberrations using a solid–state image sensor, Applied Optics, vol. 18, No. 22, Nov. 15, 1979, pp. 3866 to 3871.

(List continued on next page.)

Primary Examiner—Hoa Q. Pham
(74) Attorney, Agent, or Firm—Steven P. Shurtz; Brinks Hofer Gilson & Lione

(57) ABSTRACT

A system is provided for producing a high contrast image of features of an optical component. In the system of the present invention, light is focused through the optical component prior to reaching the detector of an image sensing means. In addition, a novel cuvette is provided for holding and locating an optical component in position during inspection. The cuvette comprises a bottom portion having a concave curved inner surface for utilizing the force of gravity to hold an optical component in place.

39 Claims, 11 Drawing Sheets

U.S. PATENT DOCUMENTS

| | | | |
|---|---|---|---|
| 3,678,564 | 7/1972 | Roberts et al. | 29/419 |
| 3,861,808 | 1/1975 | Halsey . | |
| 3,988,068 | 10/1976 | Sprague | 356/124 |
| 4,009,948 | 3/1977 | Boyan et al. | 350/319 |
| 4,125,776 | 11/1978 | Tosswill et al. | 250/508 |
| 4,197,266 | 4/1980 | Clark et al. | 264/1 |
| 4,212,707 | 7/1980 | Tosswill et al. | 204/26 |
| 4,305,643 | 12/1981 | Tosswill et al. | 350/167 |
| 4,320,977 | 3/1982 | Matsumoto | 356/427 |
| 4,337,858 | 7/1982 | Thomas et al. | 206/5.1 |
| 4,402,396 | 9/1983 | Graham | 356/246 |
| 4,508,216 | 4/1985 | Kelman | 206/5.1 |
| 4,526,445 | 7/1985 | Wogoman | 356/244 |
| 4,534,645 | 8/1985 | Nohda | 356/125 |
| 4,588,270 | 5/1986 | Tamaki | 351/124 |
| 4,609,287 | 9/1986 | Kohayakawa | 356/124 |
| 4,610,542 * | 9/1986 | Ringlier | 356/240 |
| 4,623,249 | 11/1986 | Grant | 356/124 |
| 4,680,149 | 7/1987 | Rawlings et al. | 264/2.1 |
| 4,691,820 | 9/1987 | Martinez | 206/205 |
| 4,730,924 | 3/1988 | Allard et al. | 356/125 |
| 4,779,979 | 10/1988 | Iwane | 356/125 |
| 4,782,946 | 11/1988 | Pollark | 206/5.1 |
| 4,826,315 | 5/1989 | Kohayakawa | 356/125 |
| 5,036,971 | 8/1991 | Seden et al. | 206/5.1 |
| 5,080,839 | 1/1992 | Kindt-Larsen | 206/5.1 |
| 5,134,278 * | 7/1992 | Nelen | 356/239.1 |
| 5,143,660 | 9/1992 | Hamilton et al. | 264/1.4 |
| 5,173,738 | 12/1992 | Bieri . | |
| 5,231,460 | 7/1993 | Kohayakawa | 356/127 |
| 5,303,023 | 4/1994 | Portney et al. | 356/124.5 |
| 5,443,152 * | 8/1995 | Davis | 206/5.1 |
| 5,461,570 | 10/1995 | Wang et al. . | |
| 5,500,732 | 3/1996 | Ebel et al. . | |
| 5,528,357 | 6/1996 | Davis . | |
| 5,574,554 | 11/1996 | Su et al. . | |
| 5,578,331 | 11/1996 | Martin et al. . | |
| 5,633,504 * | 5/1997 | Collins et al. | 250/461.1 |
| 5,748,300 | 5/1998 | Wilder et al. . | |
| 5,805,276 | 9/1998 | Davis et al. . | |
| 5,812,254 | 9/1998 | Ebel et al. . | |
| 5,818,573 | 10/1998 | Lafferty et al. . | |
| 5,822,698 | 3/1999 | Su et al. . | |
| 5,828,446 | 10/1998 | Davis . | |
| 5,995,213 | 11/1999 | Davis et al. . | |

OTHER PUBLICATIONS

Patent Abstracts of Japan vol. 7, No. 38, (P–176) (1183) Feb. 16, 1983 JP–A–57 190 246 (Cannon KK) Nov. 22, 1982.

Patent Abstracts of Japan vol. 5, No. 1, (P–043) Nov. 8, 1991 JP–A–55 134 339 (Cannon KK) Oct. 20, 1980.

Feliss, et al. IBM Technical Disclosure Bulletin, vol. 25, No. 4, p. 2047, Sep. 1982.

Wilder et al, "The Highlighter", Electronic Imaging of Defects in Contact Lenses, Scientifica, Jun. 1989.*

* cited by examiner

INSPECTION SYSTEM FOR OPTICAL COMPONENTS

CROSS REFERENCE TO RELATED APPLICATION

The present application is a continuation-in-part of application Ser. No. 08/099,966, filed Jul. 29, 1993, now abandoned.

FIELD OF THE INVENTION

This invention relates to a system for the inspection of optical components. The optical components to be inspected may include ocular optical components such as contact lenses, eyeglasses, intraocular lenses and the like.

BACKGROUND OF THE INVENTION

A principal objective of this invention is to provide a system for inspecting contact lenses. Prior to the present invention, optical components such as contact lenses were often inspected manually with the use of a projection-type device such as an optical comparator. Manual inspection systems requiring human intervention are not practical for high-speed production because they are too slow, because human inspectors are prone to making biased judgments, and because inspection results among different inspectors are not uniform.

A principal obstacle to automatic inspection has been the inability to produce high contrast images of optical components, such as contact lenses, so that features such as cuts, edges, scratches, tears and chips could be readily detected and measured. In particular, it has been difficult to obtain high contrast images of entire optical components. As used here, the term "features" includes both beneficial features such as certain topographical characteristics of toric lenses and lens boundaries, as well as detrimental features such as scratches, tears and chips.

The principal difficulty in obtaining high contrast images of optical components such as contact lenses and eyeglasses is that they are transparent. Moreover, in the case of certain optical components, such as hydrated contact lenses called "hydrogels" which must remain immersed in a fluid such as a saline solution, the production of high contrast images involves a further complication. That is, the refractive indices for the optical component and the liquid solution may be so similar that boundaries between the two are nearly invisible. Images of the optical component are therefore of low contrast.

Another difficulty in examining hydrogels is that they cannot be kept in a fixed position during examination and will move distances greater than the size of a small feature. Therefore, it is important to obtain a high contrast image of an entire hydrogel so that an image can be captured by an imaging system in a fraction of a second.

Another problem sought to be overcome by the present invention concerns the problem of holding an optical component in position for inspection without human intervention. Indeed, in an automated system it may be critical to have a positioning device that is actually part of the optical system used to illuminate the optical component during the automated inspection.

Japanese Patent Publication No. 55 134 339 (Oct. 20, 1980) relates to a lens inspection system for measuring the power of a lens by forming a slit image of the lens being inspected. This system is not capable of forming an image of the entire lens so that its features can be inspected.

Japanese Patent Publication No. 57 190 246 (Nov. 22, 1982) relates to a system for detecting defects in the power characteristics of an optical component. The lens to be inspected is mechanically scanned by inclining a mirror so that light scans the lens. However this system, like that of the previous paragraph is incapable of forming an image of the entire lens being inspected.

Applied Optics, vol. 18, No. 22, (Nov. 15, 1979), pages 3866–3871 relates to a system for measuring spherical aberrations in a lens. The light of this system first passes through a collimator lens and then through a pinhole array, which, of course, defocuses the light, making it unsuitable for forming a high contrast image of as optical component to be inspected.

SUMMARY OF THE INVENTION

The novel inspection system of the present invention is predicated upon the surprising discovery that despite the transparent nature of optical components, high contrast images of features of an optical component are produced by focussing light through the optical component. Specifically, the inspection system of the present invention comprises:

(A) image sensing means, having a detector, for sensing an image of an optical component; and (B) means for focussing light through the optical component prior to reaching the detector of the image sensing means.

Means for focusing light is used to provide "focused light". "Focused light" refers to light where the direction of rays is such that an image is formed in their path. Focused light is distinguished from unfocused light in that a given point on or in the optical component under test along the path of the rays of focused light is intersected by substantially a single geometric ray so that there is substantially a one-to-one mapping of rays intersecting the optical component under test to the image sensed by the image sensing means.

Preferably, focused light is transmitted through the optical component being tested such that the light reaches its focus substantially at the entrance pupil of the image sensing means. It is also preferred that the light substantially fills the entrance pupil of the image sensing means, and, preferably, the light does not substantially overfill the entrance pupil. It is also preferred that the light completely illuminates the optical component under test prior to substantially filling the entrance pupil.

In a preferred embodiment, means for focussing light can comprise a collimated light source, comprising an illuminator (any light source) and a collimated holes structure.

In another embodiment, means for focussing light can comprise a refractive collimated light source comprising an illuminator (any light source) and a collimating lens. The means for transmitting focused light can also comprise a reflective collimated light source comprising an illuminator (any light source) and an optical mirror.

In a further embodiment, means for focussing light can comprise a refractive convergent light source comprising an illuminator (any light source) and a converging lens or a reflective convergent light source comprising an illuminator (any light source) and an optical mirror.

Additionally, means for focussing light can comprise a refractive divergent light source comprising an illuminator (any light source) and a diverging lens or a reflective divergent light source comprising an illuminator (any light source) and an optical mirror.

The present invention also provides a novel receptacle or "cuvette" for holding and locating an optical component in position during inspection. The cuvette of the present invention comprises a bottom portion having a concave curved inner surface for utilizing the force of gravity to hold an optical component in place. When used in the inspection system of the present invention, the cuvette's bottom portion is made of a transparent material.

The present invention also provides novel processes for producing a high contrast image of features of an optical component comprising means for focussing light through the optical component to be inspected and then onto an image sensing means to form a high contrast image of features of the optical component on the image sensing means. In a preferred embodiment, the focused light is collimated light.

The present invention also provides novel processes for inspecting an optical component comprising means for focussing light through the optical component to be inspected prior to light's reaching the detector of an image sensing means to form a high contrast image on the image sensing means.

A detailed description of the present invention is set forth below. However, the embodiments described herein are merely illustrative; further embodiments will be apparent to those having ordinary skill in the art.

DESCRIPTION OF THE DRAWINGS

FIG. 4 is a cross sectional view of several of the holes (8) of the collimated holes structure (12) depicted in FIG. 3a.

DETAILED DESCRIPTION OF THE INVENTION

Figure 1:
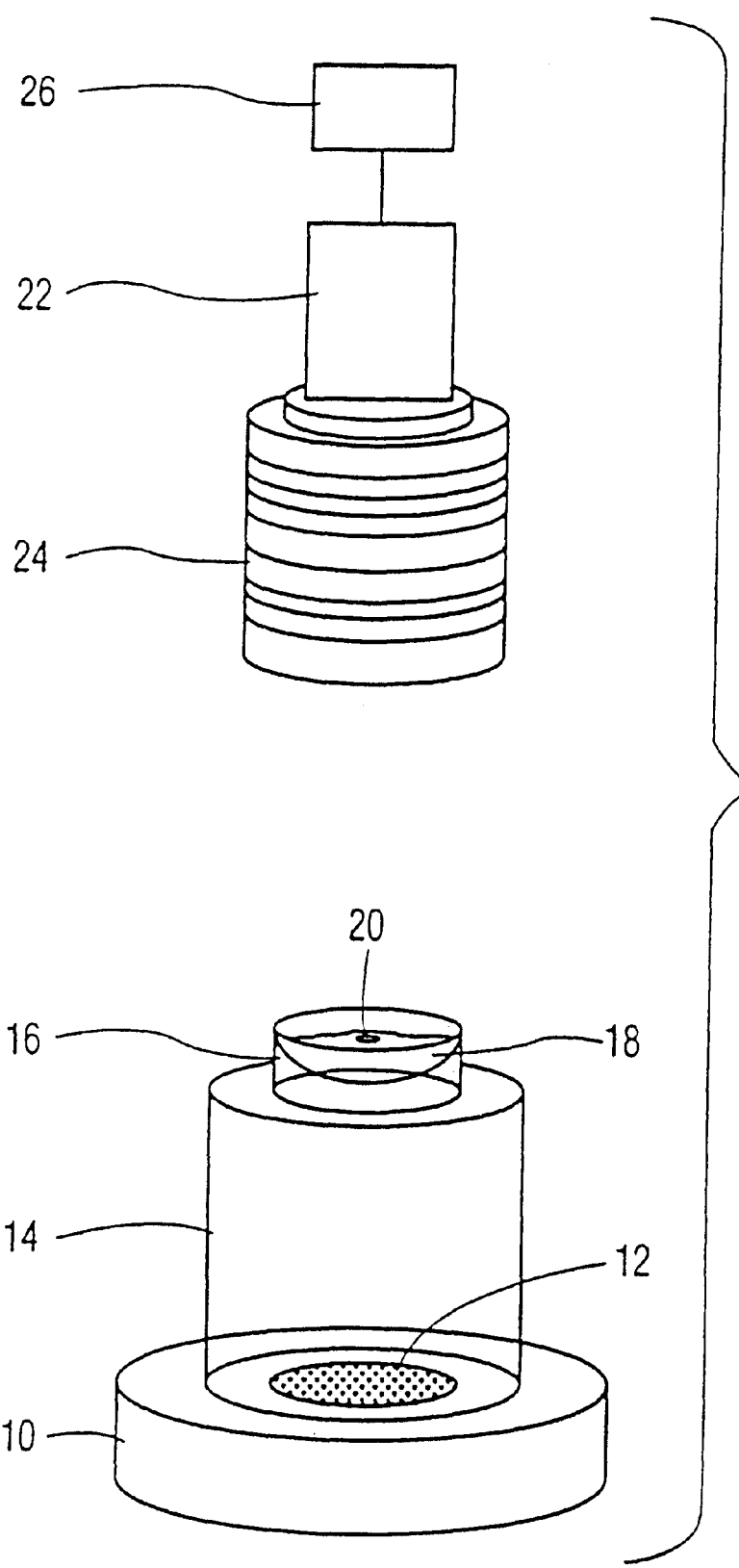
FIG. 1 is a schematic illustration of an inspection system of the present invention showing the configuration of an inspection system in a preferred embodiment employing a collimated holes structure. Neither this figure nor any of the other figures herein is drawn to scale.

In a preferred embodiment of the inspection system of the present invention, means for focussing light comprises a light source which transmits collimated light. In a specific preferred embodiment, the light source comprises an illuminator and a material having a plurality of parallel holes, preferably a collimated holes structure as described in more detail below. In particular, with reference to FIGS. 1 and 2, an illuminator (10), such as a STOCKER & YALE Model 13 fluorescent illuminator, provides light to means for collimating light—here a collimated holes structure (12). With reference to FIG. 1, a spacing member (14), which will be described in more detail below supports an inspection receptacle or "cuvette" (16) above the collimated holes structure (12). The cuvette (16) contains a saline solution (18) for maintaining hydration of an optical component, here a contact lens (20). In addition to containing the solution (18) and the contact lens (20), the cuvette has been engineered to further focus light which has been collimated by the collimated holes structure (12) through the contact lens (20). That light, in turn, reaches image sensing means for sensing an image of the optical component. The image sensing means has an entrance pupil (21, FIG. 2) and a detector (27, FIG. 2). Preferably, the detector of the image sensing means is a CCD array (27, FIG. 2). In a preferred embodiment, the image sensing means comprises a camera, preferably a video camera (22) which may optionally be a SONY XC77RR Charge Coupled Device (CCD) video camera connected to a camera lens (24, FIG. 1) which is preferably a NIKON 60 mm. MICRO-NIKKOR lens having an entrance pupil (21, FIG. 2). In this particular embodiment, the optical features are projected in a "bright"—as opposed to a "dark"—field. The image can then be transmitted to an electronic imaging system (26, FIG. 1).

The Entrance Pupil

Figure 2:
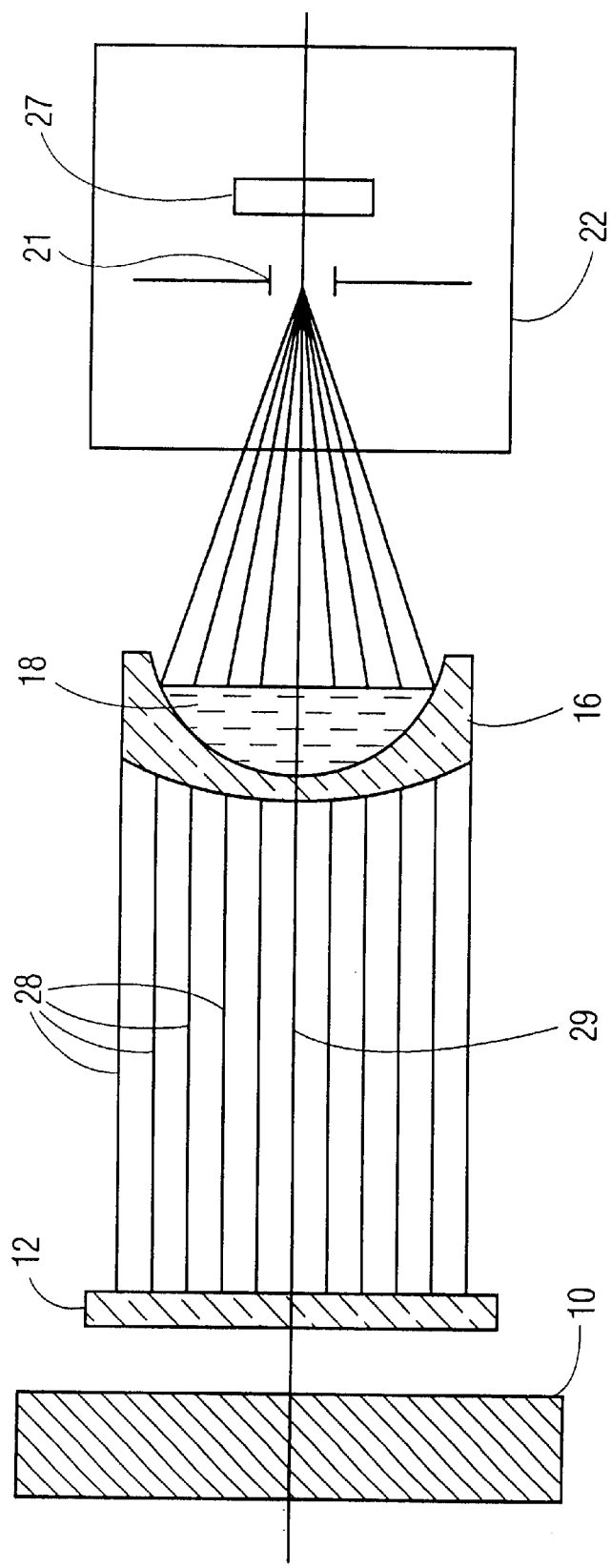
FIG. 2 is a diagram of an inspection system of the present invention showing the path of the focused light in the preferred embodiment schematically illustrated in FIG. 1.

The entrance pupil of a lens (e.g., the lens of the image sensing means of the present invention) is understood to be the image of the aperture stop as it is appears from the object side of the lens. In the NIKON 60 mm. MICRO-NIKKOR lens the aperture stop is the adjustable iris which controls the f-number. Hence, the entrance pupil of the NIKON 60 mm. MICRO-MKKOR lens is the image of the iris of this lens. Light rays which fail to enter the entrance pupil will not reach the image plane of the image sensing means. Therefore, in order to obtain as bright and uniform an image as possible, it is preferable to not overfill or underfill the entrance pupil. With reference to FIG. 2, the collimated light (28), which here is a form of focused light in accordance with the present invention, preferably reaches its focus substantially at the entrance pupil (21) of the image sensing means (22). This can also be described as focusing the light "through" the entrance pupil.

Unlike traditional imaging systems, where the illumination is not a focused beam, the aperture stop of the image sensing means may also act as a field stop, severely limiting the field of view if the light source is not properly focused through the entrance pupil. In the present invention, proper focus is achieved by the combined effects of the optics employed by the light source and the optical properties of the cuvette with solution contained within it.

When focused light is used in accordance with the present invention, it is preferred but not required that a unique mapping exists between points on the image and rays from the object such that there is substantially a one-to-one correspondence between points on the image and rays from the object. This relationship increases the contrast in the image.

Means for Collimating Light

In a specific preferred embodiment, means for collimating light comprises a disc of opaque material having thousands of small, parallel holes through its flat surfaces. A preferred material is dark glass which is light absorbing. Black glass is highly preferable. With dark glass, the interior walls of the holes will be dark in color and will thus absorb light and reduce internal reflections which cause diverging exit rays. In a preferred embodiment, the interior walls of the holes are black and the holes are preferably between 10 to 30 μm. in diameter (assuming a circle of best fit where the hole may have a non-circular shape) in a disc of between 1 to 2 mm. thickness. The aspect ratio of the holes (the ratio of the length of a hole to its diameter) is preferably 30:1 or greater.

Figures 3A, 3B:
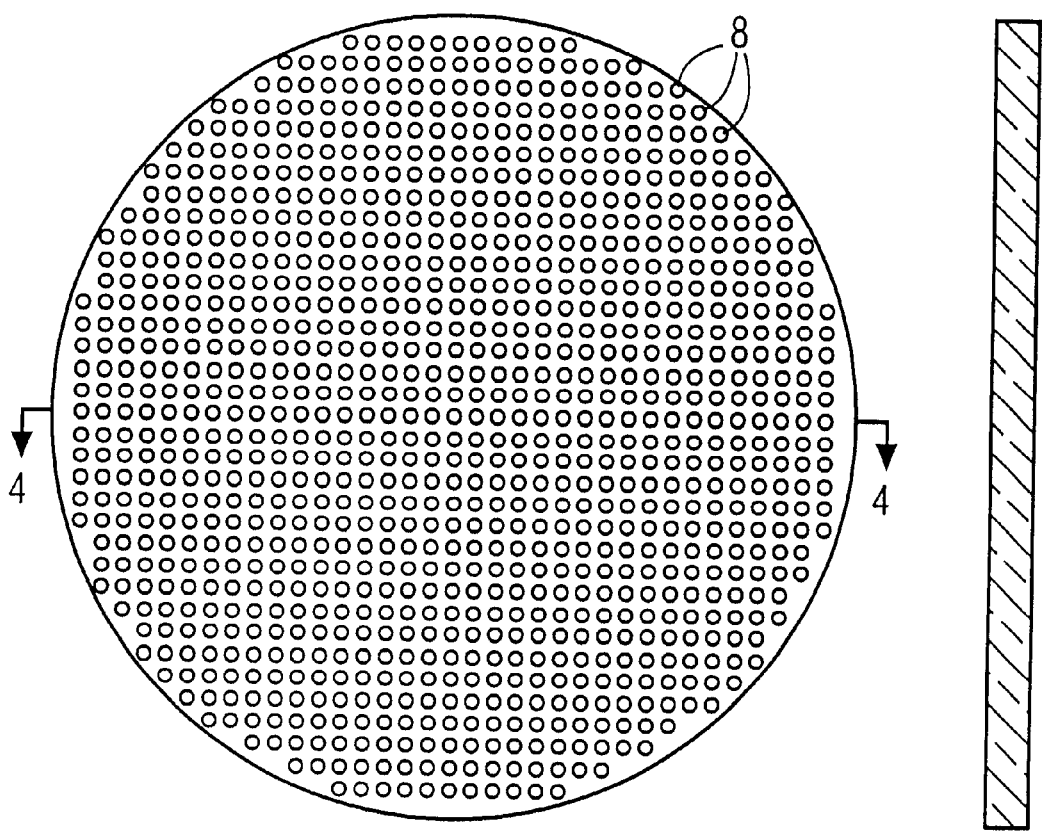
FIG. 3a is a top view and FIG. 3b is a side view of the collimated holes structure (12) used in FIG. 1. These figures are not drawn to scale, and in particular, the number and size of the holes in FIG. 3a are drawn for general illustration purposes only.
Figure 4:
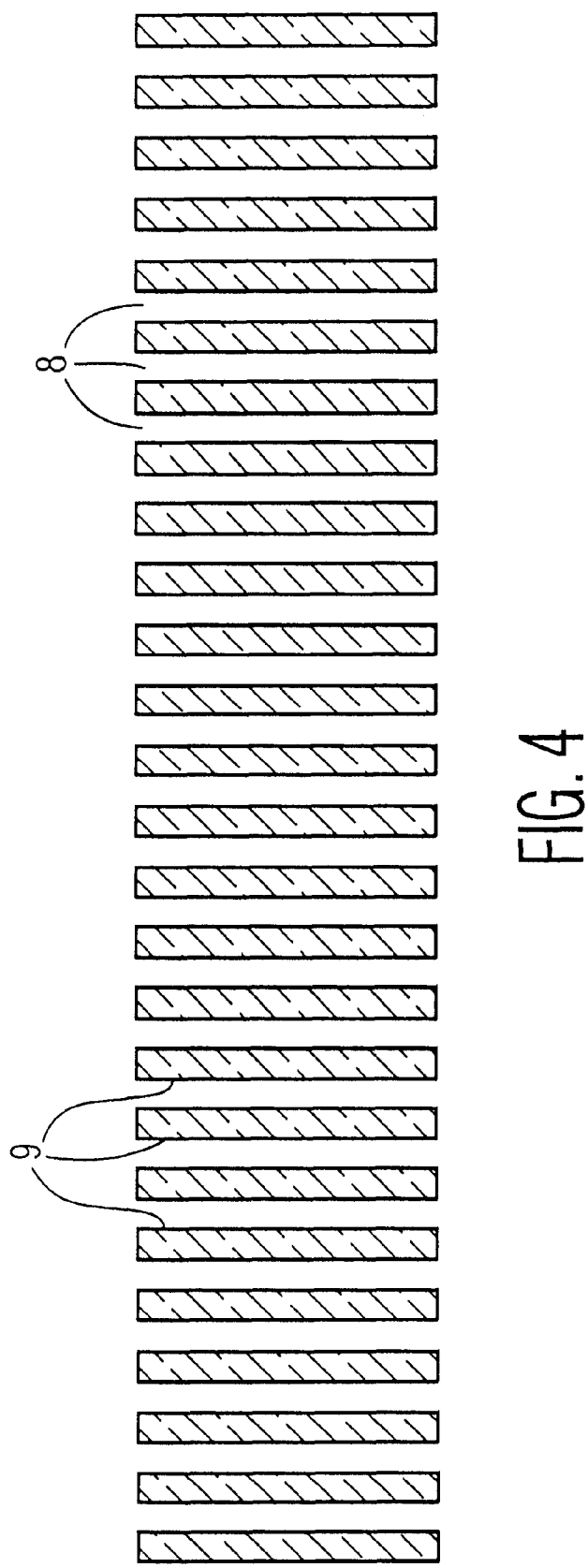

Means for collimating fight may, in a preferred embodiment, comprise a collimated holes structure (12), FIG. 3, of black opaque glass approximately 20 mm in diameter and 2 mm thick. In a more preferred embodiment, it is estimated that there are 600,000 parallel holes of approximately 20 μm diameters aligned perpendicular to the faces of the disc and penetrating through them. The opaque glass has an optical density of at least 65 Db/mm. The open area of the holes is estimated to be 60% of the surface area of a face. Such a structure is sometimes referred to as a "collimated holes structure". A preferred collimated holes structure for use in the present invention is manufactured by Collimated Holes, Inc. of Campbell California—Part No. 781-0009. With reference to FIGS. 3 and 4, the holes (8) of preferred collimated holes structure (12) have interior walls (9, FIG. 4) that are black in color and made of an opaque, light absorbing material, e.g., black opaque glass.

Camera

A preferred video camera (22) for use in the present invention contains a ⅔ inch CCD array (27) of individual sensors—each of which is capable of transducing light energy into electrical energy. The CCD array has 493 horizontal rows of individual sensors. Each row has 768 individual sensors. Thus the total array contains 378,264 individual sensors—which is approximately 63% of the number of holes used to collimate the light in this embodiment. The camera generates 30 frames or images per second. Thus, in this embodiment, the means for collimating light has a greater number of holes than the image sensing means has individual sensors in its array. The camera may be connected to a video monitor to view the image of the optical component or connected to an electronic imaging system (26, FIG. 1) which can analyze automatically image electrical signals received from camera (22).

When a video camera is used to image a contact lens without the use of means for focussing light in accordance with this invention, it is very difficult or impossible to detect and measure features such as cuts, edges, scratches, tears or chips. With the use of means for focussing light, e.g. collimated light structure (12), high contrast portions of the image of the optical component correspond to the features in the optical component. Thus, there appears to be a 1:1 correspondence between high contrast areas in an image and features in a contact lens.

Electronic Imaging System

A preferred embodiment of the present invention further comprises image sensing means incorporating an electronic imaging system (26, FIG. 1) for analyzing image signals received from the camera (22), wherein the electronic imaging system comprises means for detecting in the image signals an "image property" corresponding to a given feature appearing in the optical component. For instance, where an 8-bit electronic imaging system is used (as for example one containing an EPIX Model 10 Imaging Board), an "image property", as the term is used herein can constitute a value in the range from 0 to 255 which is assigned to each gray level in an image. Without means for focussing light (e.g. collimated holes structure (12)), differences in gray levels caused by features generally were in the range of about 10 gray levels. Since variations in lighting across the image can be approximately of the same magnitude, accurate feature detection and measurement was not possible. With the use of means for focussing light in accordance with the present invention, high contrast images of features having differences greater than 20 gray levels are readily obtained. This has permitted accurate detection and measurement of features.

Illuminator

The STOCKER & YALE Model 13 fluorescent illuminator was selected as a preferred illuminator in the present invention because it contains a 20 Khz ballast which appears to the camera (22) with a 30 frame-per-second frame rate as a flicker-free illuminator and thus prevents the occurrence of video "hum" bars in images. The light also has a low heat content which prevents damage to contact lenses being inspected. The light to be used in the present invention need not necessarily be light within the visible light spectrum. Other forms of light can include, e.g., infrared light.

Cuvette

Figure 5:
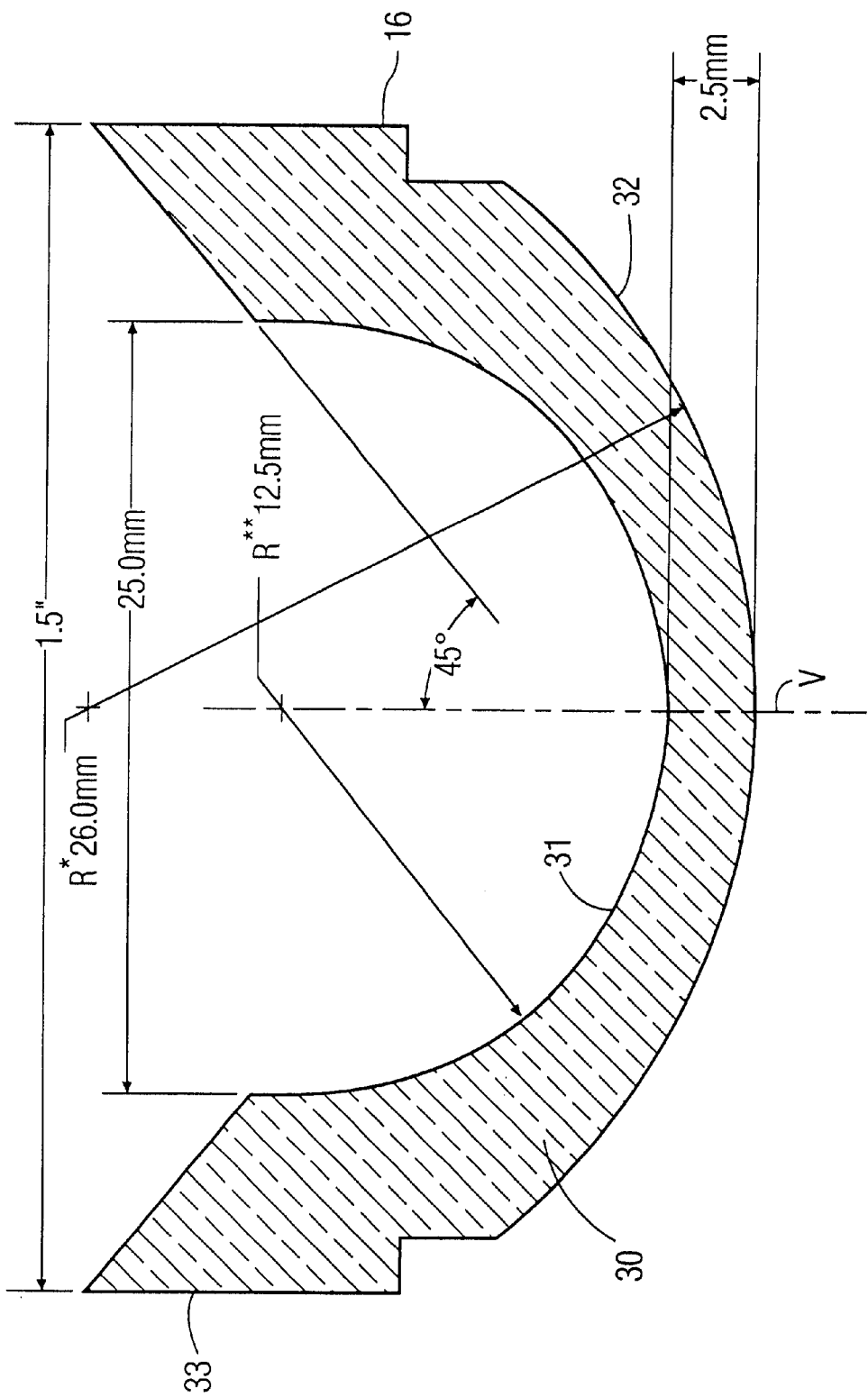
FIG. 5 is a cross sectional view of a preferred embodiment of the cuvette of the present invention showing several specific measurements. A three dimensional perspective of this cuvette can be generated by rotating the drawing about its vertical axis, V.

The present invention provides receptacle or "cuvette" (16) for holding an optical component in position during inspection. Referring to FIG. 5, the cuvette (16) of the present invention comprises a bottom portion (30) having a concave inner surface (31) for utilizing the force of gravity to hold an optical component in the center of the cuvette. Preferably, the concave curve of the inner surface (31) has a radius of curvature in order to maximize the force of gravity upon the optical component positioned therein for the purpose of locating the optical component. (The optical component is not shown in FIG. 5). The radius of curvature of the inner surface (31) is preferably equal to or greater than the radius of curvature of the particular surface of the optical component which is intended to be closest to the cuvette's concave inner surface (31). Basically, the radius of curvature of the cuvette's concave inner surface (31) is chosen to be as steep as possible to maximize the centering ability of the cuvette while being shallow enough to maintain center contact with the optical component under inspection. This minimizes the distance that an optical component (20, FIG. 1), such as a hydrogel, can move in ⅟₃₀ second, the time typically required to freeze an image of an optical component. In order to obtain reliable feature detection, it is highly desirable to restrict the distance a hydrogel can move in one frame time (i.e., ⅟₃₀ second) to a distance less than the smallest size feature which must be detected.

When the cuvette of the present invention is used in connection with this invention's novel inspection system, the cuvette's bottom portion (30) is made of a transparent material, such as an optically clear polycarbonate or polystyrene plastic, and, under such circumstances, the radius of curvature of the bottom portion's inner surface has a second purpose. This curve (31), in combination with the surface geometry of the outer surface (32) of the cuvette's bottom portion, provides optical power. Specifically, the surface geometry of the bottom portion's outer surface (32) which is preferably convex, is selected so that the light which has been focused substantially fills the entrance pupil of the image sensing means and thus reaches its focus substantially at the entrance pupil. It should be noted here that the optical power provided by the cuvette of the present invention; i.e., the power to focus light so that it substantially fills the entrance pupil of the image sensing, can be used in any embodiment of the system of the present invention, regardless of whether the light source transmits collimated light, convergent light, or divergent light.

The transparent material used to form the cuvette's bottom portion (30) can also be made of glass or of an acrylic material such as polymethmethacrylate.

Under certain circumstances, such as the inspection of hydrated contact lenses, it is desirable to keep the lens immersed in a liquid solution, especially a saline solution. Under such circumstances, the cuvette of the present invention can be constructed to hold a liquid solution. With reference to FIG. 5, this can be accomplished by providing a "water-tight" cuvette wherein side walls (33) of the cuvette's bottom portion (30) extend upward for a sufficient height such that liquid will be contained within the cuvette without leaking or spilling.

In constructing the inspection system of the present invention, it may be desirable to separate the cuvette (16) from collimated holes structure (12). By separating the cuvette (16) from structure (12), it is possible to focus the lens of camera (24) on optical component (20) without bringing the structure (12) into the camera lens's depth-of-field. To obtain a desirable distance between cuvette (16) and structure (12), a hollow cylindrical spacing member (14), shown in FIG. 1, can be placed in between these two components. Preferably, spacing member (14) has a height of approximately 2" (5.13 cm), an inside diameter of approximately 1.25 (3.2 cm) and an outside diameter of approximately 2" (5.13 cm), and preferably the spacing member is made of dark gray plastic so as to minimize internal reflection. The dimensions provided above and in FIG. 5 are the more preferred dimensions. It is believed that satisfactory results will be achieved if they are varied by as much as ±50%, more preferably not more than ±25%, of these preferred values. With regard to the radius R* in FIG. 5, the radius of curvature of the bottom portion's outer surface (32), this dimension is preferably 26.0 mm when the bottom portion (30) is polymethylmethacrylate and preferably 22.3 mm when the bottom portion is polycarbonate. R**, the radius of curvature of the bottom portion's inner surface (31), is preferably 12.5 mm.

With regard to a preferred alignment of this embodiment of the system of 10 the present invention, the image sensing means is optically aligned with the collimated holes structure (12), the clear cuvette (16) and the optical component to be inspected (20) such that the optical axes of each are coaxial. (See optical axis (29) in FIG. 2).

USE OF A REFRACTIVE COLLIMATED LIGHT SOURCE

Figure 6:
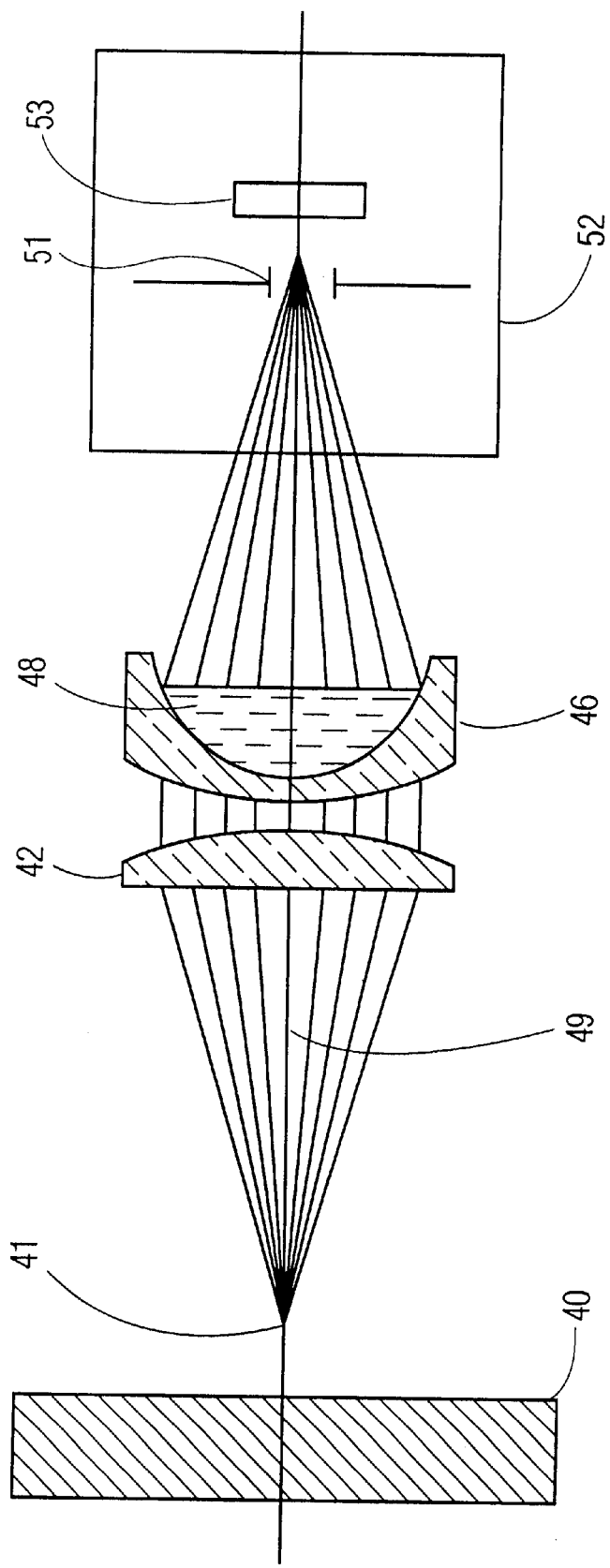
FIG. 6 is a diagram of an inspection system of the present invention showing an embodiment wherein means for focussing light comprises a refractive collimated light source.

In another embodiment of the present invention, means for focussing light comprises a refractive collimated light source, comprising an illuminator (any light source) and a collimating lens. This embodiment, which is shown in FIG. 6, comprises an illuminator (40), such as the STOCKER & YALE Model 13 illuminator, which provides light to a pinhole (41). A collimating lens (42) is then used to collimate the light. The pinhole (41) is then considered as the object for the collimating lens (42) which focuses the image of the pinhole at infinity.

In a specific embodiment constructed in accordance with the present invention, the pinhole diameter was 500 microns and the collimating lens (42) was an achromatic doublet (P/N 23-9756 from Ealing Electro-Optics of Holliston, Mass.) with a focal length of 200 mm. Of course, one of ordinary skill in the art will recognize that the diameter and the focal length may be varied depending upon the luminance of the illuminator, the sensitivity of the image sensing means, and the degree of collimation required to obtain a satisfactorily high contrast image on the image sensing means. The specific pinhole used in this preferred embodiment was Model No. 39729 from Edmund Scientific Corp. of Barrington, N.J.

Preferably, a cuvette as described above is used in connection with this embodiment and the collimated light is focused by the cuvette before passing through the optical component under test. With reference to FIG. 6, the curvature of the cuvette radii must be chosen such that the focal length of the cuvette (46) is appropriate to focus the light substantially at the entrance pupil (51) of the image sensing means (52), when the distance between the image sensing means and the optical component is adjusted to provide the desired magnification of the optical component. Preferably, illuminator (40), pinhole (41), collimating lens (42), cuvette (46), solution (48), entrance pupil (51), camera (52) and CCD (53) are optically aligned along optical axis (49).

USE OF A REFRACTIVE CONVERGENT LIGHT SOURCE

Figure 7:
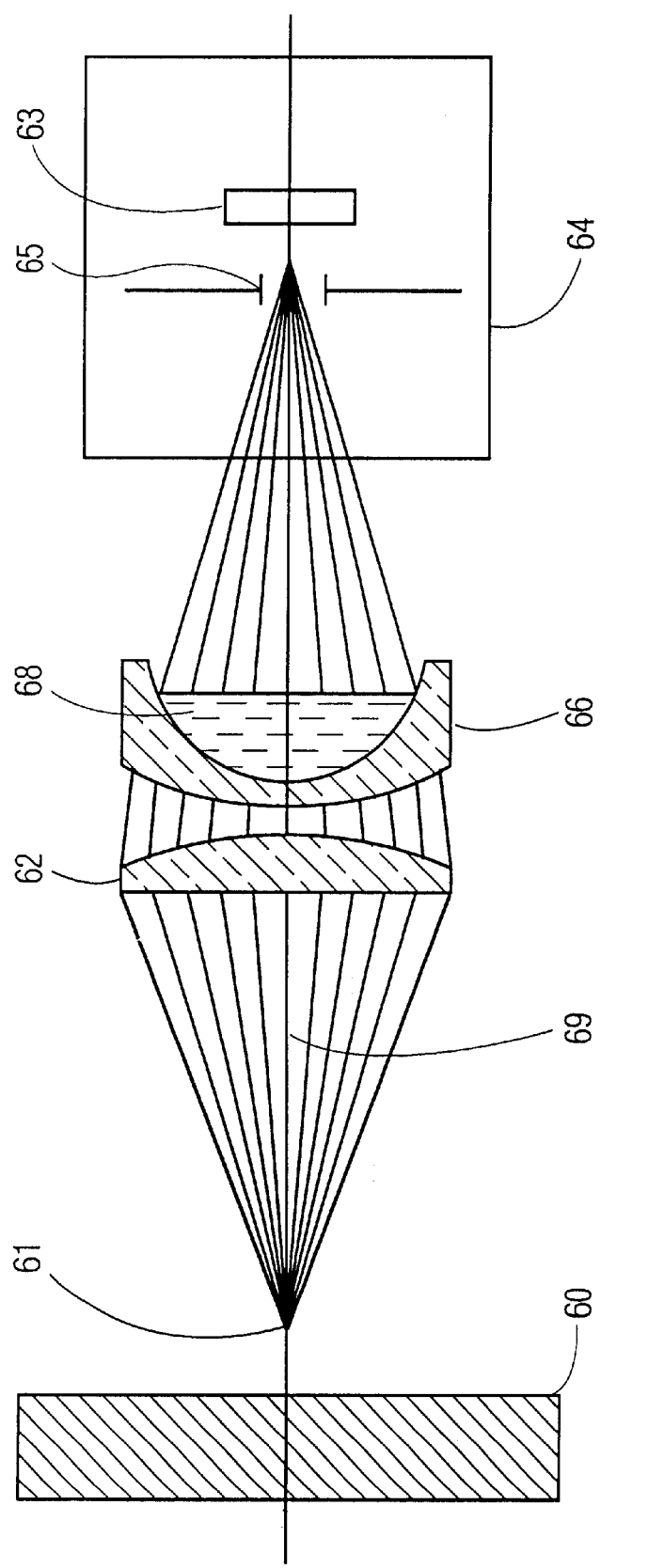
FIG. 7 is a diagram of an inspection system of the present invention showing an embodiment wherein means for focussing light comprises a refractive convergent light source.

FIG. 7 shows an alternate embodiment which does not use collimated light. In this embodiment a converging lens (62) would be used. Light from the illuminator (60) would be made to converge through converging lens (62) by adjusting the distance between the converging lens and the pinhole (61) so that this distance is more than the focal length of the converging lens. Light would then be focused further through the surfaces of the cuvette (66) and solution (68), until it focuses substantially at the entrance pupil (65) of the image sensing means (camera 64). The high contrast properties of the image would be equivalent to the system incorporating collimated light. Preferably, illuminator (60), pinhole (61), converging lens (62), cuvette (66), solution (68), entrance pupil (65), camera (64) and CCD (63) are optically aligned along optical axis (69).

USE OF A REFRACTIVE DIVERGENT LIGHT SOURCE

Figure 8:
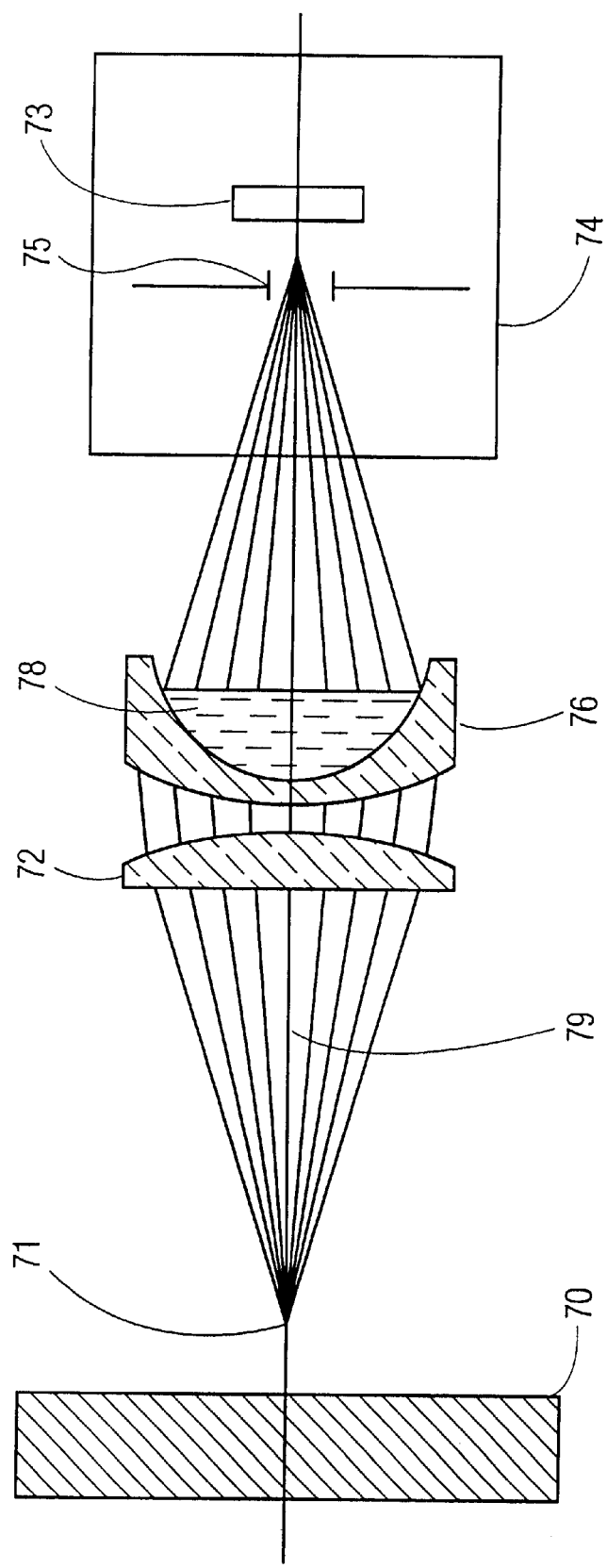
FIG. 8 is a diagram of an inspection system of the present invention showing an embodiment wherein means for focussing light comprises a refractive divergent light source.

In another embodiment, light would be focused by means of refraction of light emitted from a divergent light source comprising an illuminator (any light source) and a diverging lens. Specifically, as shown in FIG. 8, light from illuminator (70) would be made to diverge through diverging lens (72) by separating pinhole (71) and the diverging lens (72) by less than one focal length of the diverging lens. Light would then be focused further through the surfaces of cuvette (76) and solution (78), until it focuses substantially at the entrance pupil (75) of the image sensing means (camera 74). A high contrast image would thus be achieved similar to the high contrast image previously described. Preferably, illuminator (70), pinhole (71), diverging lens (72), cuvette (76), solution (78), entrance pupil (75) and camera (74) and CCD (73) are optically aligned along optical axis (79).

USE OF A REFLECTIVE COLLIMATED LIGHT SOURCE

Knowing that light from the illuminator must be substantially focused at the entrance pupil of the image sensing means and the image of the optical component being tested must be focused at the image sensing means, this can be accomplished by a light source using reflective optics as well as refractive optics or a collimated hole structure, as previously described. This embodiment comprising a reflective collimated light source is shown in FIG. 9.

Figure 9:
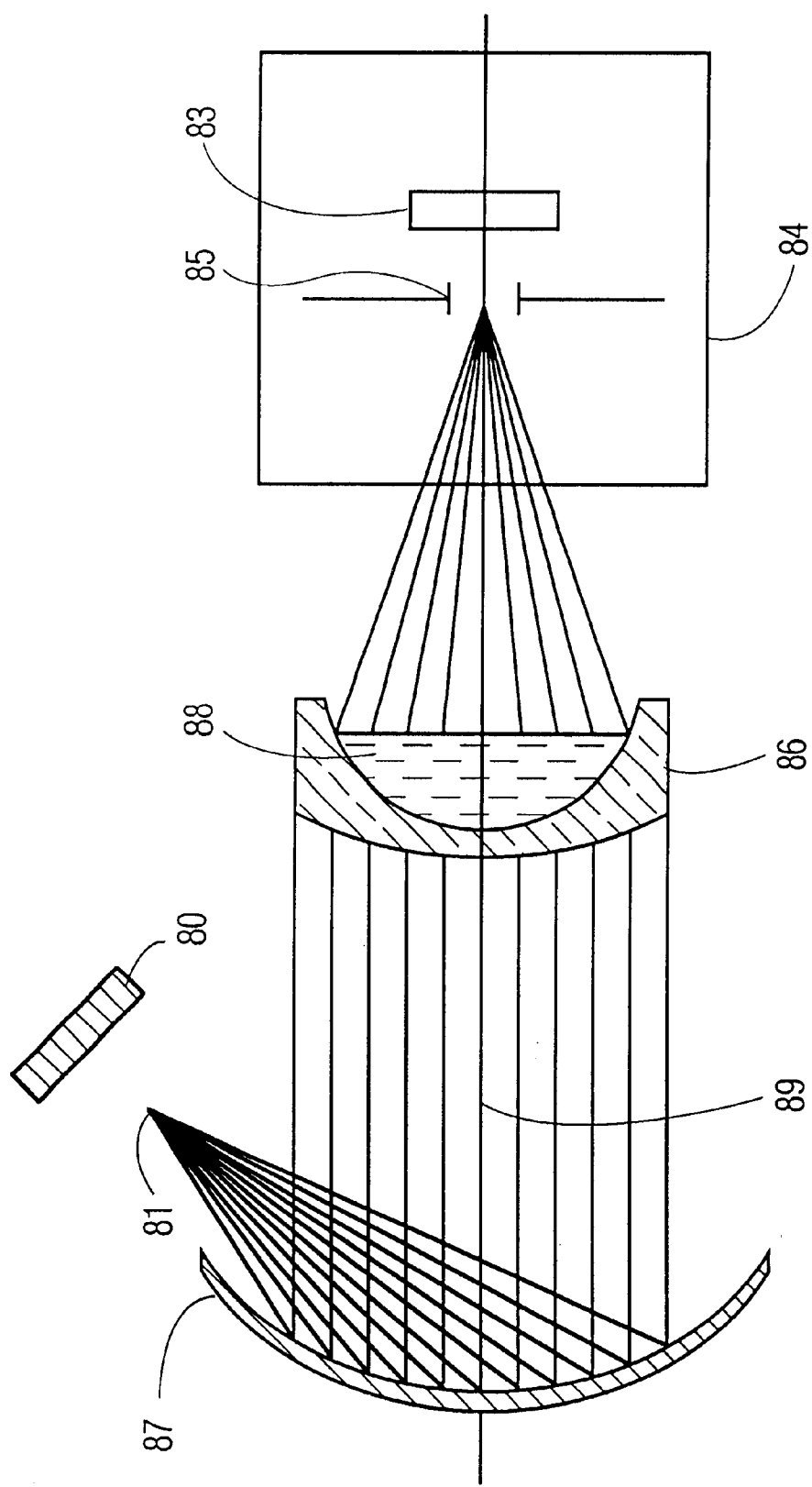
FIG. 9 is a diagram of an inspection system of the present invention showing an embodiment wherein means for focussing light comprises a reflective collimated light source.

Thus, FIG. 9 shows a system identical to FIG. 6 except that an off axis parabolic mirror (87) is used as a collimator. The mirror is aligned with the optical axis (89) and there is a pinhole (81) which is placed off-axis at the focal point of the mirror. The pinhole receives light from illuminator (80). Preferably, parabolic mirror (87), cuvette (86), solution (88), entrance pupil (85), camera (84) and CCD array (83) are optically aligned along optical axis (89).

USE OF A REFLECTIVE CONVERGENT LIGHT SOURCE

Figure 10:
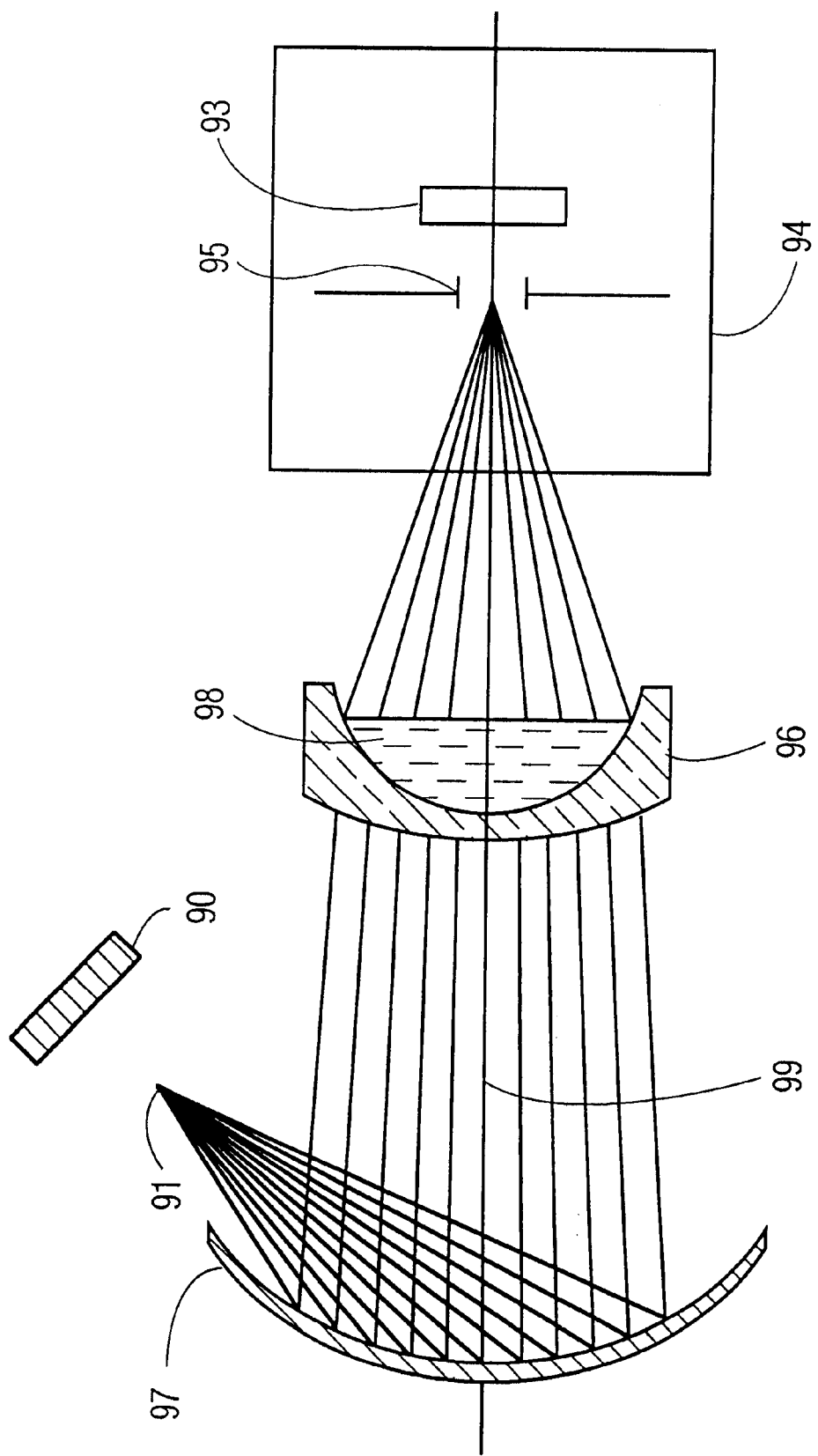
FIG. 10 is a diagram of an inspection system of the present invention showing an embodiment wherein means for focussing light comprises a reflective convergent light source.

FIG. 10 is similar to FIG. 9 except that the pinhole (91) is more than one focal length distance from the off-axis parabolic mirror (97). The light source is then convergent as in FIG. 7. The pinhole (91) receives light from illuminator (90). Preferably, parabolic mirror (97), cuvette (96), solution (98), entrance pupil (95), camera (94) and CCD array (93) are optically aligned along optical axis (99).

USE OF A REFLECTIVE DIVERGENT LIGHT SOURCE

Figure 11:
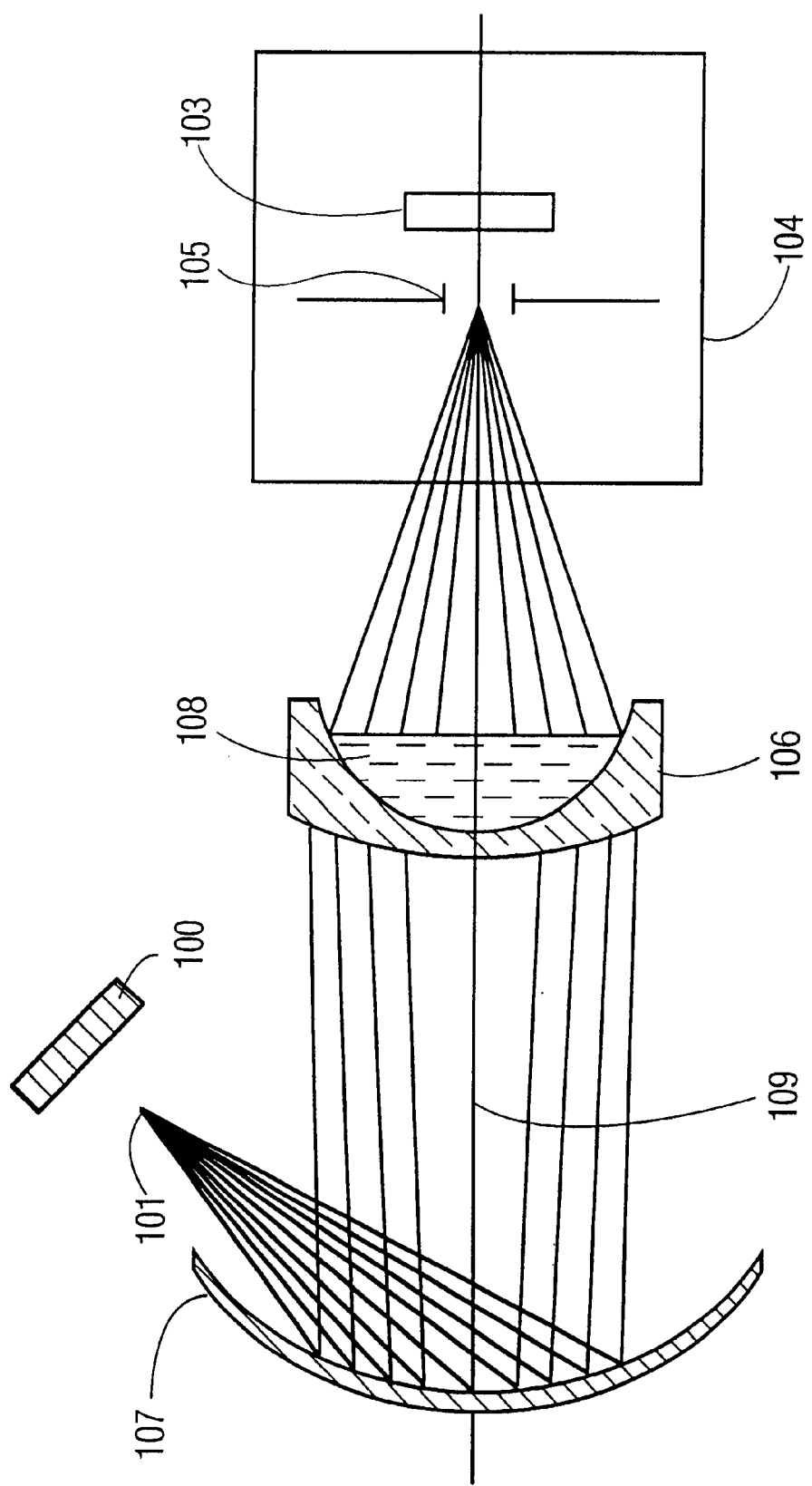
FIG. 11 is a diagram of an inspection system of the present invention showing an embodiment wherein means for focussing light comprises a reflective divergent light source.

FIG. 11 is similar to FIG. 9 except that the pinhole (101) is less than one focal length from the off axis parabolic mirror (107). The light source is then divergent as in FIG. 8. The pinhole (101) receives light from illuminator (100). Preferably, parabolic mirror (107), cuvette (106), solution (108), entrance pupil (105), camera (104) and CCD array (103) are optically aligned along optical axis (109).

Many modifications and variations of the present invention can be made without departing from its spirit and scope, as will become apparent to one of ordinary skill in the art. The specific embodiments described herein are offered by way of example only, and the invention should not be construed as limited thereby.

What is claimed is:

1. A system for producing a high contrast bright field image of features of an ocular optical component under inspection, comprising:
   a) image sensing means, having a detector and an entrance pupil for sensing light focused through the ocular optical component under inspection;
   b) means for focussing light through the ocular optical component, wherein the image sensing means has an optical axis which is optically aligned with an optical axis of the means for focussing light and an optical axis of the ocular optical component such that the optical axes of each are substantially coaxial; and
   c) a source of light,
   d) said light focusing means focusing light through the ocular optical component under inspection, thereby producing a high contrast bright field image of the features of the ocular optical component;
   e) wherein the ocular optical component is contained within a cuvette having a transparent bottom portion, the cuvette's bottom portion comprising a convex outer surface and an adjacent concave inner surface, wherein the geometry of the outer surface is selected so that the image of the light which has been focused substantially fills the entrance pupil of the image sensing means.

2. A system according to claim 1 wherein the light reaches its focus substantially at the entrance pupil of the image sensing means.

3. A system according to claim 2 wherein the light does not substantially overfill the entrance pupil.

4. A system according to claim 1 wherein said means for focussing light includes a refractive collimated light source comprising a collimating lens.

5. A system according to claim 1 wherein said means for focussing light includes a refractive converging lens.

6. A system according to claim 1 wherein said means for focussing light includes a refractive diverging lens.

7. A system according to claim 1 wherein said means for focussing light includes a reflective collimated light source having an optical mirror.

8. A system according to claim 1 wherein said means for focussing light includes a reflective convergent light source having an optical mirror.

9. A system according to claim 1 wherein said means for focussing light includes a reflective divergent light source having an optical mirror.

10. A system according to claim 1 wherein the image sensing means comprises a video camera for generating image signals.

11. A system according to claim 10, wherein the video camera comprises an image sensor containing an array of individual sensors, wherein each individual sensor is capable of transducing light energy into electrical energy.

12. A system according to claim 11, wherein said means for focussing light includes a material having parallel holes formed by interior walls and the number of parallel holes is greater than the number of individual sensors in the image sensing means.

13. The system according to claim 10, further comprising an electronic imaging system for analyzing image signals received from the video camera, wherein said electronic imaging system comprises a means for detecting an image property in the signal from the video camera corresponding to a feature appearing in the ocular optical component.

14. The system of claim 10, further comprising an electronic imaging system for analyzing image signals received from the video camera, wherein said electronic imaging system comprises a means for detecting an image property in the signal from the video camera corresponding to a feature appearing in the ocular optical component.

15. The system of claim 1 wherein the ocular optical component under inspection is a contact lens.

16. The system of claim 1 wherein the light completely illuminates the ocular optical component under inspection and the image of the entire ocular optical component under inspection is sensed by the image sensing means.

17. The system of claim 1 wherein the means for focusing light through the ocular optical component includes a means for collimating light.

18. The system of claim 17 wherein the means for collimating light comprises a material having a plurality of parallel holes.

19. The system of claim 18, wherein the parallel holes are formed by interior walls that are dark in color.

20. The system of claim 18, wherein the parallel holes are formed by interior walls that are made of an opaque material.

21. The system of claim 18, wherein the parallel holes are formed by interior walls that are made of light-absorbing material.

22. The system of claim 21, wherein the interior walls are made of black opaque glass.

23. The system of claim 18, wherein the parallel holes have an aspect ratio of 30:1 or greater.

24. The system of claim 18, wherein the parallel holes have a diameter in the range of from 10 to 30 $\mu$m.

25. A system of claim 18, wherein the parallel holes are cylindrical in shape having a height in the range of from 1 to 2 mm and a diameter in the range of from 10 to 30 $\mu$m.

26. The system of claim 1 wherein the bottom portion of the receptacle is made of plastic.

27. A system for producing a high contrast bright field image of features of an ocular optical component under inspection, comprising:
   a) image sensing means, having a detector, for sensing light focused through the ocular optical component under inspection;
   b) means for focussing light through the ocular optical component, and
   c) a source of light,
   d) said light focussing means focussing light through the ocular optical component under inspection, thereby producing a high contrast bright field image of the features of the ocular optical component,
   e) wherein the ocular optical component is contained within a receptacle having a bottom portion made of a transparent material and having a concave inner surface, wherein the bottom portion's concave inner surface has a radius of curvature and said radius of curvature is at least equal to a radius of curvature of the particular surface of the ocular optical component which is intended to be closest to the concave inner surface of the bottom portion of the receptacle.

28. A system for producing a high contrast bright field image of features of an ocular optical component under inspection, comprising:
   a) image sensing means, having a detector and an entrance pupil, for sensing light focused through the ocular optical component under inspection;
   b) means for focussing light through the ocular optical component, and
   c) a source of collimated light,
   d) said light focussing means focussing light through the ocular optical component under inspection, thereby producing a high contrast bright field image of the features of the ocular optical component,
   e) wherein the ocular optical component is contained within a receptacle having a bottom portion made of a transparent material and having a concave inner surface, wherein the receptacle's bottom portion further comprises a convex outer surface, and wherein the outer surface geometry is selected so that the image of the light which has been collimated substantially fills the entrance pupil of the image sensing means.

29. The system of claim 28, wherein the ocular optical component is immersed in an aqueous solution contained in the receptacle.

30. A system for inspecting visual features of an ocular optical component comprising:
   a) a source of light;
   b) an optical parallel holes structure for collimating said light which is aligned to transmit light through said parallel holes structure and then through an ocular optical component to yield an illuminated ocular optical component:
   c) a light-detecting apparatus which senses said illuminated ocular optical component and provides high contrast bright field image signals of the ocular optical component; and
   d) means for imaging said high contrast image signals to detect visual features of the ocular optical component including means for bringing light from said illuminated ocular optical component under inspection to a focus onto the surface of a light-detecting device of said light-detecting apparatus;
   e) wherein the ocular optical component is a hydrogel lens in an aqueous solution, and the system further includes a receptacle within which said hydrogel lens is carried, said receptacle having a light-transparent base and a concavity in said base within which said hydrogel lens is located, said receptacle having an optical power which is selected to direct light from said parallel holes structure to an entrance pupil of said light-detecting apparatus.

31. The system of claim 30 wherein said light-detecting apparatus includes a charge coupled device, with light from said illuminated ocular optical component being focused at the surface of said charge coupled device, and light from said parallel holes structure substantially fills said entrance pupil.

32. A system for inspecting visual features of an ocular optical component comprising:
   a) a source of light;
   b) an optical parallel holes structure for collimating said light which is aligned to transmit light through said parallel holes structure and then through an ocular optical component to yield an illuminated ocular optical component;
   c) a light-detecting apparatus which senses said illuminated ocular optical component and provides high contrast bright field image signals of the ocular optical component; and
   d) means for imaging said high contrast image signals to detect visual features of the ocular optical component;
   e) wherein said ocular optical component is carried in a liquid within a concavity in a receptacle, said receptacle having a transparent base through which said collimated light passes to illuminate the ocular optical component, said receptacle further having a first radius of curvature for said concavity which is about the same as or greater than a radius of curvature for a surface of the ocular optical component carried within said concavity which ocular optical component surface is most adjacent said concavity during inspection, said receptacle additionally having a convexity to said base which convexity is coincident with an optical axis of said concavity and has a second radius of curvature which is selected to yield an optical power to said receptacle, said receptacle serving as a focal element in directing said collimated light.

33. A cuvette for holding and locating an optical component in position for inspection comprising: a bottom portion having a concave curved inner surface, wherein the concave inner surface has a radius of curvature that is equal to or greater than the radius of curvature of the particular surface of the optical component under inspection that is intended to be closest to the cuvette's concave inner surface, to thus utilize the force of gravity to position the optical component and minimize its movement;

said bottom portion having a convex outer surface, the radius of curvature of said outer surface being selected so that said concave inner surface and said convex outer surface cooperate to provide optical power that will focus light through said bottom portion and to a selected location.

34. The cuvette of claim 33 wherein the bottom portion of the cuvette is made of a transparent material.

35. The cuvette of claim 33 wherein the bottom portion of the cuvette is made of plastic.

36. The cuvette of claim 35 wherein the cuvette is capable of containing liquid.

37. A combination of the cuvette of claim 33 and a contact lens in the cuvette as the optical component under inspection.

38. The cuvette of claim 33 wherein said radius of curvature of said outer surface is selected so that collimated light directed upwardly through said bottom portion is converged by the optical power of the cuvette such that it passes through said optical component and is focused at an entrance pupil of an image sensing device.

39. The combination of claim 37 wherein the cuvette contains a liquid through which the light passes, and further wherein the radii of curvature of said inner and outer surfaces and the optical characteristic of the liquid combine so that collimated light directed upwardly through said bottom portion is converged by the optical power of the cuvette such that it passes through said contact lens and is focused at an entrance pupil of an image sensing device.

* * * * *

UNITED STATES PATENT AND TRADEMARK OFFICE
CERTIFICATE OF CORRECTION

PATENT NO. : 6,301,005 B1 Page 1 of 1
DATED : October 9, 2001
INVENTOR(S) : Sheldon L. Epstein et al.

It is certified that error appears in the above-identified patent and that said Letters Patent is hereby corrected as shown below:

<u>Title page,</u>
Item [56], References Cited, under "OTHER PUBLICATIONS", delete "Wilder et al, "Electronic Imaging of Defects in Contact Lens", Scientifica, Jun. 1989.* "The Highlighter System", Jun. 1989.*".
Delete "5,822,698" and substitute -- 5,882,698 -- in its place.

<u>Column 9,</u>
Line 52, insert -- , -- (comma) immediately after "pupil".

Signed and Sealed this

Tenth Day of September, 2002

Attest:

JAMES E. ROGAN
*Attesting Officer*  *Director of the United States Patent and Trademark Office*